(12) United States Patent
Guo et al.

(10) Patent No.: US 12,166,521 B2
(45) Date of Patent: Dec. 10, 2024

(54) ELECTRONIC DEVICE WHERE A FIRST SHELL AND A SECOND SHELL ARE MATCHED TO SUPPORT A COVER

(71) Applicant: Honor Device Co., Ltd., Shenzhen (CN)

(72) Inventors: Renwei Guo, Shenzhen (CN); Yangjie Tang, Shenzhen (CN); Xuyang Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 444 days.

(21) Appl. No.: 17/764,290

(22) PCT Filed: Oct. 27, 2020

(86) PCT No.: PCT/CN2020/124028
§ 371 (c)(1),
(2) Date: Mar. 28, 2022

(87) PCT Pub. No.: WO2021/093573
PCT Pub. Date: May 20, 2021

(65) Prior Publication Data
US 2022/0376729 A1 Nov. 24, 2022

(30) Foreign Application Priority Data
Nov. 15, 2019 (CN) .......................... 201911121539.1

(51) Int. Cl.
*H04B 1/3888* (2015.01)

(52) U.S. Cl.
CPC .................................. *H04B 1/3888* (2013.01)

(58) Field of Classification Search
CPC .......... H04B 1/3827–3888; H04M 1/02–0202; H04M 1/0249; H04M 1/0269; H05K 5/00–0013; H05K 5/0217; H05K 5/03
See application file for complete search history.

(56) References Cited

U.S. PATENT DOCUMENTS

| 10,324,493 B2 | 6/2019 | Kwak et al. |
| 11,116,094 B2 | 9/2021 | Zhao et al. |

(Continued)

FOREIGN PATENT DOCUMENTS

| CN | 201242023 Y | 5/2009 |
| CN | 204439971 U | 7/2015 |

(Continued)

*Primary Examiner* — Ronald Eisner
(74) *Attorney, Agent, or Firm* — Fish & Richardson P.C.

(57) ABSTRACT

This application provides an electronic device, including a first cover, a first shell, and a second shell. The first cover includes a first side portion, a middle portion, and a second side portion. The middle portion is connected between the first side portion and the second side portion. The first side portion and the second side portion are spaced apart from and opposite to each other to form an opening. The first side portion, the middle portion, and the second side portion are enclosed to form an accommodating cavity. The first shell and the second shell are both mounted in the accommodating cavity. The first shell and the second shell are matched to support the first cover. The solution of this application can resolve the problem of difficulty in assembling the shells with an exterior part.

20 Claims, 12 Drawing Sheets

(56) References Cited

U.S. PATENT DOCUMENTS

| | | | |
|---|---|---|---|
| 2007/0285337 | A1 | 12/2007 | Maddock |
| 2013/0107433 | A1 | 5/2013 | Mycroft et al. |
| 2016/0156754 | A1 | 6/2016 | Cotelo |
| 2018/0184532 | A1 | 6/2018 | Kim et al. |
| 2018/0275719 | A1 | 9/2018 | Kwak et al. |
| 2020/0076937 | A1* | 3/2020 | Ackerman ........... H04B 1/3888 |
| 2020/0315048 | A1* | 10/2020 | Zhao .................... H05K 5/0226 |

FOREIGN PATENT DOCUMENTS

| | | | | |
|---|---|---|---|---|
| CN | 105263281 | A | | 1/2016 |
| CN | 106055027 | A | | 10/2016 |
| CN | 207218781 | U | | 4/2018 |
| CN | 207489951 | U | | 6/2018 |
| CN | 108566454 | A | | 9/2018 |
| CN | 208081852 | U | | 11/2018 |
| CN | 208141355 | U | | 11/2018 |
| CN | 109087588 | A | | 12/2018 |
| CN | 109087588 | B | * 12/2018 | ............... G09F 9/30 |
| CN | 109246260 | A | | 1/2019 |
| CN | 110012138 | A | | 7/2019 |
| CN | 110035155 | A | | 7/2019 |
| CN | 209402893 | U | | 9/2019 |
| CN | 209497492 | U | | 10/2019 |
| CN | 209540372 | U | | 10/2019 |
| JP | 2016048357 | A | | 4/2016 |

* cited by examiner

ELECTRONIC DEVICE WHERE A FIRST SHELL AND A SECOND SHELL ARE MATCHED TO SUPPORT A COVER

CROSS-REFERENCE TO RELATED APPLICATIONS

This application is a national stage of International Application No. PCT/CN2020/124028, filed on Oct. 27, 2020, which claims priority to Chinese Patent Application No. 201911121539.1, filed on Nov. 15, 2019. The disclosures of the aforementioned applications are hereby incorporated by reference in their entireties.

TECHNICAL FIELD

This application relates to the field of terminal devices, and in particular, to an electronic device.

BACKGROUND

To pursue a simple and consistent appearance, an electronic device is usually designed with an integrated exterior part that includes a main body and side walls. A shell is required to be mounted on the inner side of the exterior part to support the exterior part. However, it is difficult to mount the shell when assembling the shell with the exterior part.

SUMMARY

This application provides an electronic device and a middle frame, so as to resolve the problem of difficulty in assembling a shell with an exterior part.

According to a first aspect, this application provides an electronic device, including a first cover, a first shell, and a second shell. The first cover includes a first side portion, a middle portion, and a second side portion. The middle portion is connected between the first side portion and the second side portion. The first side portion and the second side portion are spaced apart from and opposite to each other to form an opening. The first side portion, the middle portion, and the second side portion are enclosed to form an accommodating cavity. The first shell and the second shell are both mounted in the accommodating cavity. In a direction from the first side portion to the second side portion, the first shell and the second shell are adjacent to each other side by side. The first shell and the second shell are fixedly connected. The first shell and the second shell are matched to support the first cover.

The first cover may serve as an exterior part of the electronic device. Both the first side portion and the second side portion may be bent relative to the middle portion, so that the first cover forms a cylindrical structure with two open ends. The first side portion and the second side portion are connected to two opposite sides of the middle portion, and the first side portion is spaced apart from the second side portion, so that the first cover encloses to form a C-shaped accommodating cavity having an opening. The first shell and the second shell are adjacent to each other side by side and fixedly connected, so as to jointly support the first cover. The first shell and the second shell are of a split design, and can be separately mounted in the accommodating cavity to be matched with the first cover. This makes assembling of the first cover easy, and avoids interference during assembling.

In an implementation, the accommodating cavity is closed up at the opening. Being closed up means that two ends of the accommodating cavity come closer at the opening, and a circumferential length of the opening is not equal to a maximum circumferential length of an inner wall of the accommodating cavity. Because the first shell and the second shell are of a split design, compared with an integrated shell, the first shell and the second shell can be separately mounted in the accommodating cavity, and does not interfere with the inner wall of the accommodating cavity that is in a closed-up state. Therefore, the split design and the separated assembling method of the first shell and the second shell can be well adaptable to the structure of the accommodating cavity that is in a closed-up state.

In an implementation, the first side portion and the second side portion are both arched in directions facing away from each other. The first cover of this structure may have a plump and flared appearance effect, thereby improving experience on appearance of the electronic device and also enhancing user's sense of grip. The split design and the separated assembling method of the first shell and the second shell can be well adaptable to the structure of the accommodating cavity. Therefore, the solution in this implementation achieves good manufacturability and good experience on appearance of the electronic device.

In an implementation, a bending angle of the first side portion ranges from 150 degrees to 180 degrees; and/or a bending angle of the second side portion ranges from 150 degrees to 180 degrees. Therefore, the first cover is bent at a large angle, which can create a plump and flared appearance effect, thereby improving experience on appearance of the electronic device, and also enhancing user's sense of grip. The split design and the separated assembling method of the first shell and the second shell can be well adaptable to the structure of the accommodating cavity. Therefore, the solution in this implementation achieves good manufacturability and good experience on appearance of the electronic device.

In an implementation, an end, far away from the second shell, of the first shell is close to the first side portion, and an end, far away from the first shell, of the second shell is close to the second side portion. This design can make good use of an internal space of the accommodating cavity to mount the first shell and the second shell. In an implementation, a distance between an end, far away from the second shell, of the first shell and an end, far away from the first shell, of the second shell is a first distance, and the first distance is greater than a width of the opening. This design can make good use of the widest portion in the accommodating cavity to mount the first shell and the second shell, thereby increasing utilization of structure space. In addition, the split design and the separated assembling method of the first shell and the second shell can be well adaptable to the structure of the accommodating cavity. Therefore, the solution in this implementation achieves good manufacturability and good experience on appearance of the electronic device.

In an implementation, the first cover includes a curved cover plate and a curved screen; the curved cover plate includes the first side portion, the middle portion, and the second side portion; the curved screen is accommodated in the accommodating cavity and fits the curved cover plate; and both the first shell and the second shell are fixedly connected to a surface, facing away from the curved cover plate, of the curved screen. When the first cover is a curved screen module, stereo display at a large visual angle can be achieved by the electronic device.

In an implementation, the first shell includes a first fitting surface, the second shell includes a second fitting surface, and the first fitting surface and the second fitting surface form a detachable connection or a non-detachable connection. This matching structure is simple, and is easy to manufacture and assemble.

In an implementation, the first fitting surface and the second fitting surface are both inclined planes, and the first fitting surface and the second fitting surface are matched with each other, so as to form a detachable connection. This matching structure is simple, and is easy to manufacture and assemble.

In an implementation, the first fitting surface fits the second fitting surface, and the first fitting surface and the second fitting surface are both smooth inclined planes. This matching structure is simple, and is easy to manufacture and assemble.

In an implementation, the first fitting surface is protrusively provided with at least one first engaging protrusion, the second fitting surface is provided with at least one first engaging slot, and the at least one first engaging protrusion is matched with the at least one first engaging slot. This matching structure is simple, is easy to manufacture and assemble, and has good connection strength.

In an implementation, the first fitting surface and the second fitting surface are both inclined planes, and the first fitting surface and the second fitting surface are connected by using an adhesive, so as to form a non-detachable connection. This matching structure is simple, is easy to manufacture and assemble, and has good connection strength.

In an implementation, the first fitting surface and the second fitting surface are both stepped surfaces, and the first fitting surface and the second fitting surface are engaged with each other, so as to form a detachable connection or a non-detachable connection. This matching structure is simple, is easy to manufacture and assemble, and has good connection strength.

In an implementation, the first fitting surface and the second fitting surface are connected by using an adhesive, so as to form a non-detachable connection. This matching structure is simple, is easy to manufacture and assemble, and has good connection strength.

In an implementation, the first fitting surface includes a first sub-surface and a second sub-surface, where the first sub-surface and the second sub-surface are connected at an included angle, and the second sub-surface is protrusively provided with a second engaging protrusion; and the second fitting surface includes a third sub-surface and a fourth sub-surface, where the third sub-surface and the fourth sub-surface are connected at an included angle, the third sub-surface is opposite to the first sub-surface, the fourth sub-surface is provided with a second engaging slot, and the second engaging protrusion is inserted into the second engaging slot, and forms a non-detachable connection with an inner wall of the second engaging slot by using an adhesive. This matching structure is simple, is easy to manufacture and assemble, and has good connection strength.

In an implementation, the first shell and the second shell form a non-detachable connection by using a connector. This matching structure is simple, is easy to manufacture and assemble, and has good connection strength.

In an implementation, the electronic device includes a second cover, where the second cover is arranged at the opening, and covers the curved screen, the first shell, and the second shell within the accommodating cavity. The arrangement of the second cover enables the electronic device to have a complete and integrated appearance, and can also enhance structure strength of the electronic device.

In an implementation, the second cover includes a display screen, where the display screen may be a flat display screen, or may be a curved screen. When the second cover serves as a display screen, the electronic device can achieve surrounding omnidirectional displaying.

In an implementation, the electronic device includes a third cover and a fourth cover, where the third cover and the fourth cover are respectively mounted at two opposite ends of the first cover, the third cover is located on the same side as the first side portion, the middle portion, and the second side portion, and the fourth cover is located on the same side as the first side portion, the middle portion, and the second side portion. The arrangement of the second cover enables the electronic device to have a complete and integrated appearance, and can also enhance structure strength of the electronic device.

In an implementation, the third cover includes a display screen, and/or the fourth cover includes a display screen. The display screen may be a flat display screen, or may be a curved screen. When the third cover and/or the fourth cover are used as a display screen, the electronic device can achieve 360-degree surrounding omnidirectional displaying.

In an implementation, the electronic device includes electronic components, and the electronic components are mounted on the first shell and/or the second shell. The electronic components may include a circuit board and a functional device arranged on the circuit board. A side, facing away from the first cover, of the first shell and/or the second shell may be provided with both the circuit board and the functional device, and a side, facing the first cover, of the first shell and/or the second shell may be provided with the functional device only.

In an implementation, the electronic device is a mobile phone, and the first shell and the second shell constitute a middle frame of the mobile phone. The middle frame with a split design can be well adaptable to the structure of the first cover, so that both manufacturability and experience on appearance of the mobile phone are good.

According to a second aspect, this application provides a middle frame, configured to support an exterior part of an electronic device. The exterior part is enclosed to form a C-shaped accommodating cavity having an opening. The middle frame includes a first shell and a second shell, where the first shell and the second shell are configured to be mounted in the accommodating cavity. The first shell and the second shell are adjacent to each other side by side and fixedly connected. The first shell and the second shell are configured to jointly support the exterior part. The middle frame with a split design can be well adaptable to the structure of the exterior part, so that both manufacturability and experience on appearance of the electronic device are good.

BRIEF DESCRIPTION OF DRAWINGS

To describe the technical solutions in the implementations of this application or in the background, the following describes the accompanying drawings required for describing the implementations of this application or the background.

DESCRIPTION OF EMBODIMENTS

Figure 1:
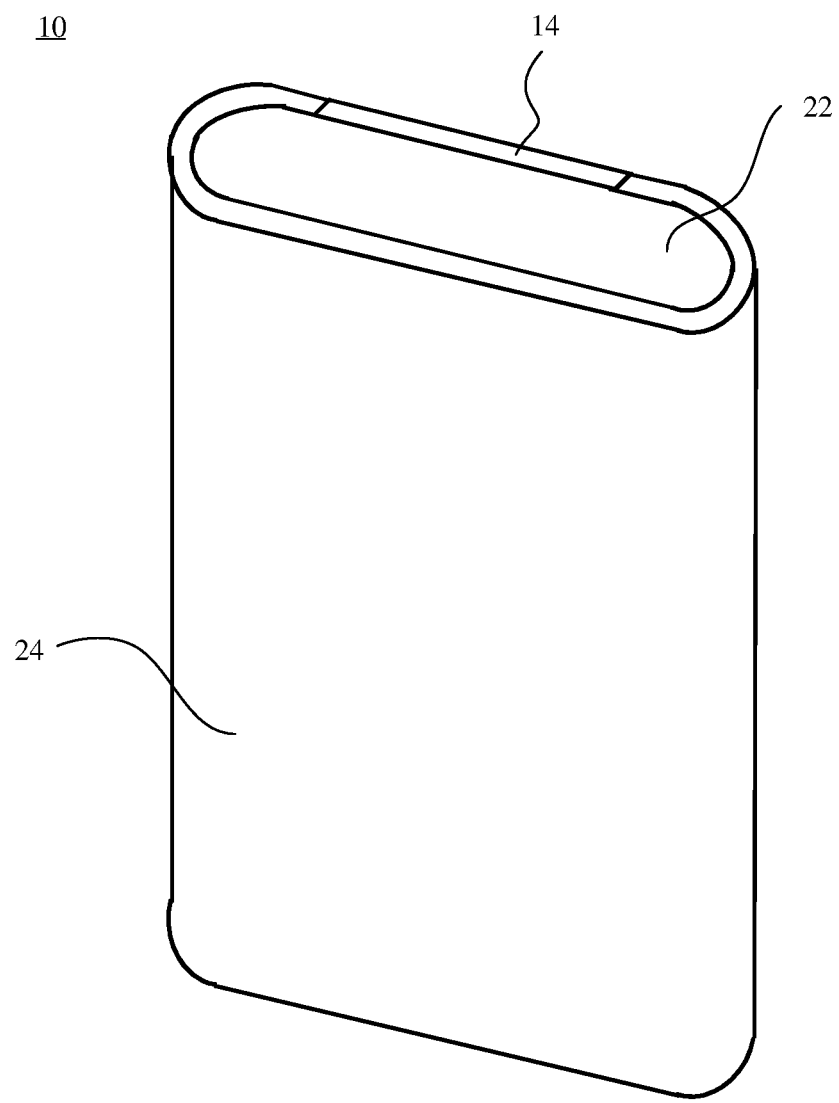
FIG. 1 is a schematic perspective view of an electronic device according to Embodiment 1 of this application.

The following embodiments of this application provide an electronic device 10. The electronic device 10 includes, but is not limited to, a mobile phone, a tablet computer, an electronic reader, a vehicle-mounted device, a power bank, and the like. An example in which the electronic device 10 is a mobile phone is used for description below.

As shown in FIG. 1 to FIG. 4, the electronic device 10 may include a first cover 24, a bearing structural member, a second cover 14, a third cover 22, and a fourth cover 23.

Figure 2:
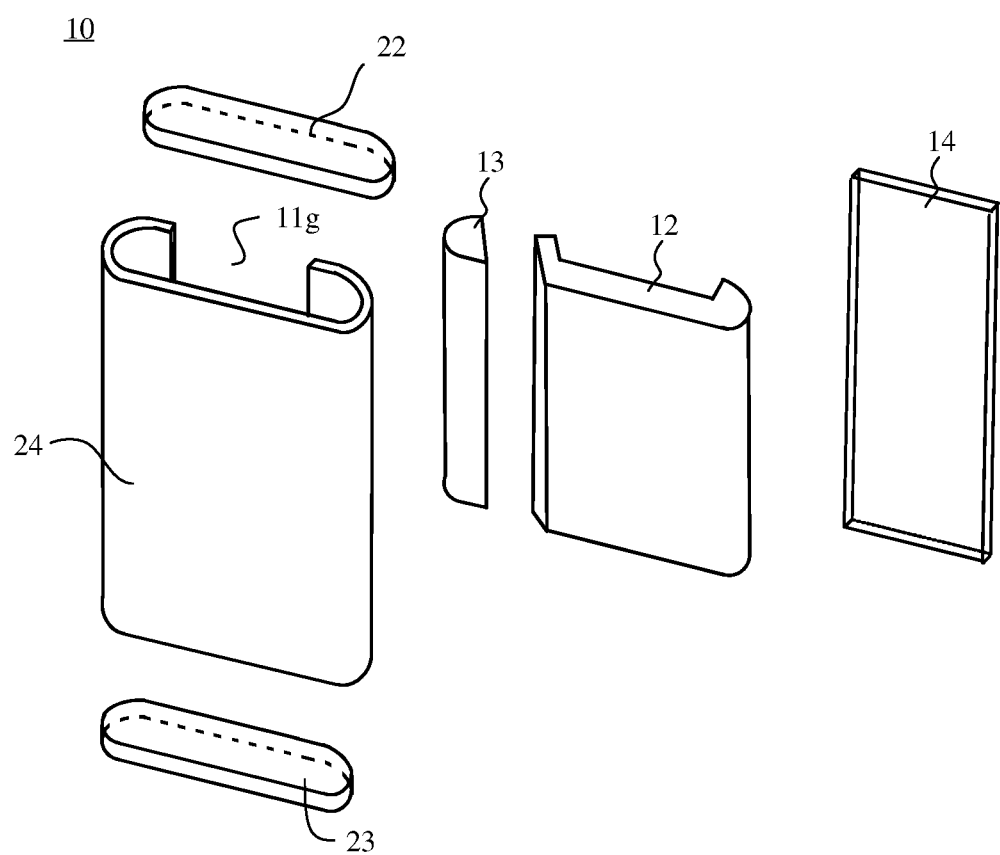
FIG. 2 is an exploded schematic diagram of the electronic device shown in FIG. 1.
Figure 3:
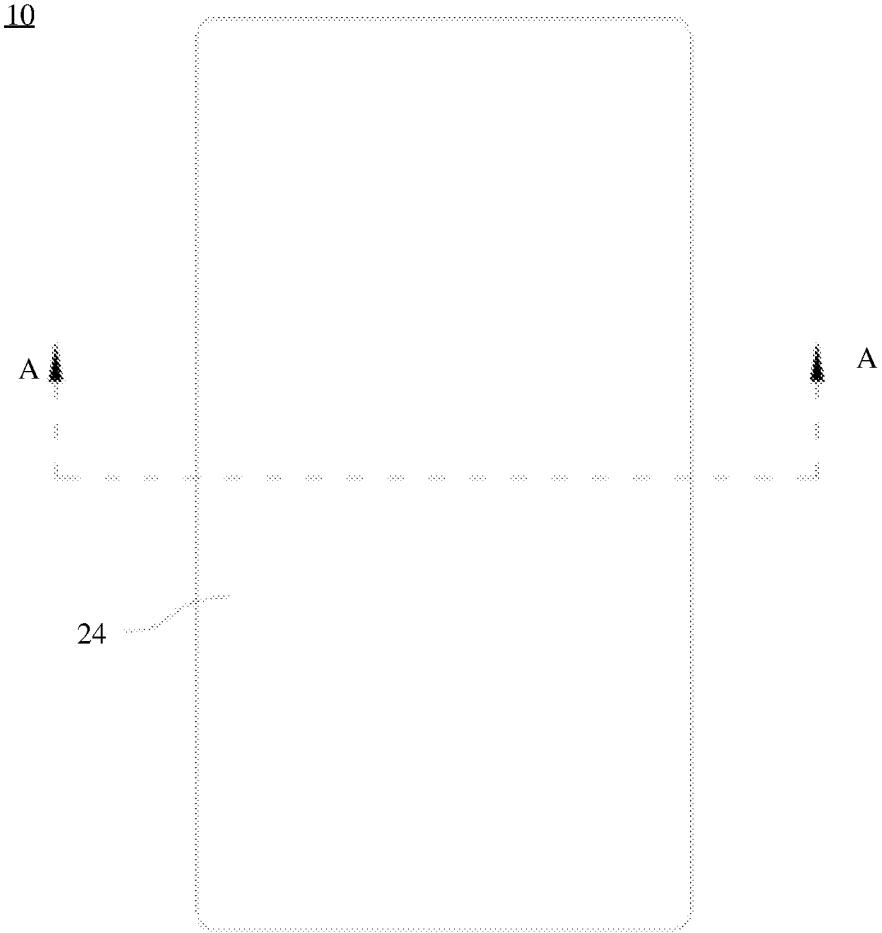
FIG. 3 is a front view of the electronic device shown in FIG. 1.
Figure 4:
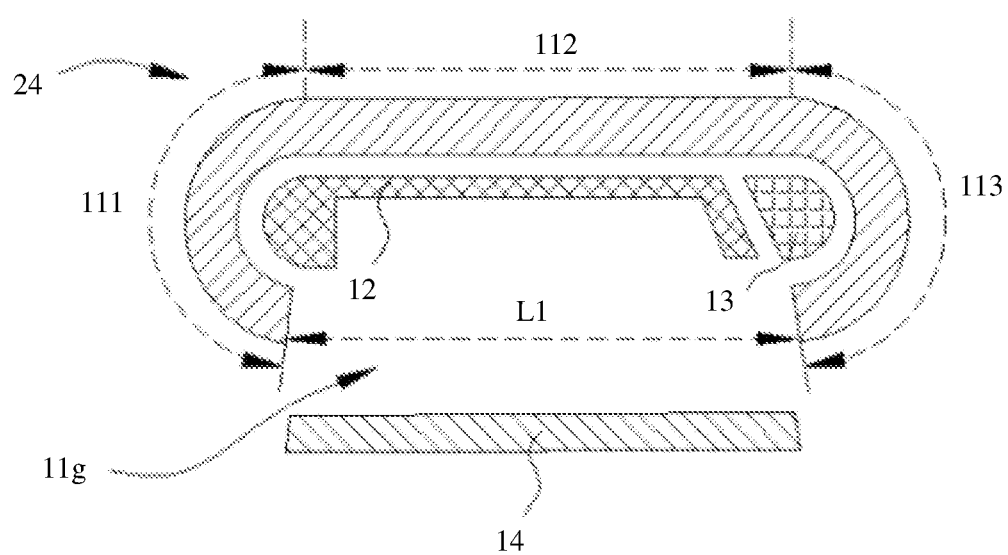
FIG. 4 is a cross-sectional view taken along A-A of the electronic device shown in FIG. 3.

As shown in FIG. 2 and FIG. 4, the first cover 24 may include a first side portion 111, a middle portion 112, and a second side portion 113, and the middle portion 112 is connected between the first side portion 111 and the second side portion 113. The middle portion 112 may be of a plate structure with uniform or substantially uniform thickness, for example, a flat plate structure or a curved plate structure. Alternatively, the middle portion 112 may be of a plate structure with non-uniform thickness, for example, a surface of the middle portion 112 (this surface may serve as an exterior surface of the electronic device 10) may be a cambered surface, and a surface opposite to the cambered surface may be a plane.

The structures of the first side portion 111 and the second side portion 113 may be the same or different. The first side portion 111 and/or the second side portion 113 may be of a plate structure with uniform or substantially uniform thickness, for example, a flat plate structure or a curved plate structure. Alternatively, the first side portion 111 and/or the second side portion 113 may be of a plate structure with non-uniform thickness.

Figure 5:
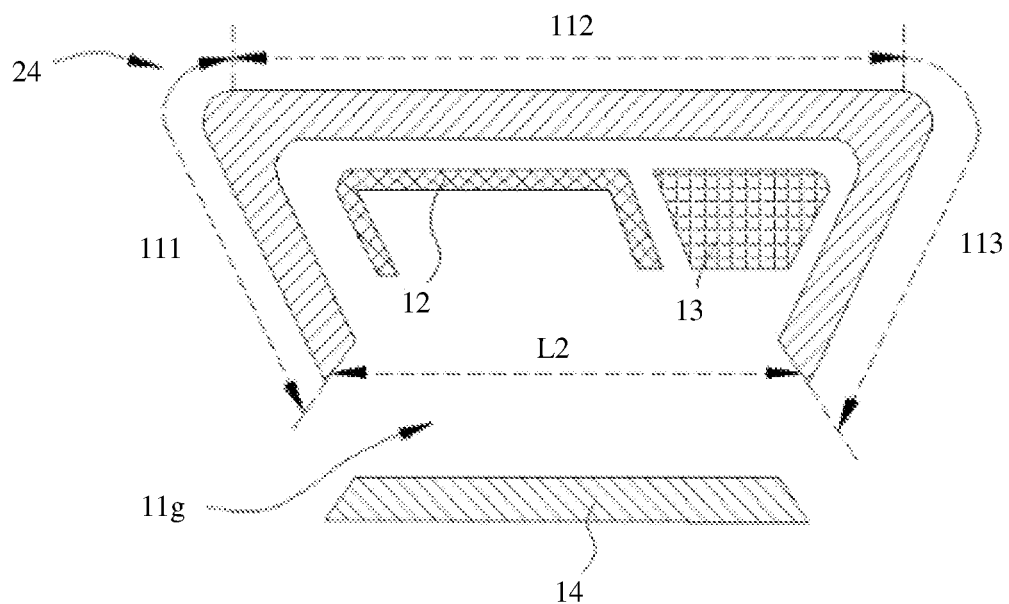
FIG. 5 is a cross-sectional view taken along A-A of an electronic device according to another embodiment.

Both the first side portion 111 and the second side portion 113 may be bent relative to the middle portion 112. For example, as shown in FIG. 4, both the first side portion 111 and the second side portion 113 are substantially curved plates. The first side portion 111 and the second side portion 113 are both arched in directions facing away from each other. A length, along a bending direction, of the first side portion 111 and a length, along a bending direction, of the second side portion 113 may be the same or different. Alternatively, as shown in FIG. 5, the first side portion 111 and the second side portion 113 are both flat plates; and the first side portion 111 and the second side portion 113 are both inclined in a direction approaching each other, relative to the middle portion 112. The first side portion 111 and the middle portion 112 form a first included angle, and the second side portion 113 and the middle portion 112 form a second included angle. The first included angle and the second included angle are both acute angles, and the first included angle and the second included angle may be the same or different.

An opening 11g is formed between an end, far away from the middle portion 112, of the first side portion 111 and an end, far away from the middle portion 112, of the second side portion 113, so that the first side portion 111, the middle portion 112, and the third side portion 113 are enclosed to form a C-shaped accommodating cavity. The accommodating cavity is closed up at the opening 11g. For example, as shown in FIG. 4, a circumferential length of the highest portion of the arch of an inner wall of the accommodating cavity is the maximum, and a circumferential length L1 of the opening 11g is less than the maximum circumferential length. The circumferential length of the inner wall of the accommodating cavity is gradually reduced from the highest portion of the arch to the opening 11g. Alternatively, for example, as shown in FIG. 5, from the bottom of the accommodating cavity to the opening 11g, the circumferential length of the inner wall of the accommodating cavity is gradually reduced, and a circumferential length L2 of the opening 11g is the minimum. The circumferential length can be calculated as follows: Several planes substantially parallel to the middle portion 112 intersect the inner wall of the accommodating cavity to obtain several intersecting lines. The length of each intersecting line may be referred to as a circumferential length of the inner wall of the accommodating cavity.

As shown in FIG. 2, both upper and lower ends of the C-shaped accommodating cavity are open (due to the viewing angle, the lower end of the accommodating cavity is not shown). That is, the accommodating cavity may be of a cylindrical structure with two open ends. The bearing structural member may be mounted in the accommodating cavity of the first cover 24, and the bearing structural member may support the first cover 24. The bearing structural member may include a first shell 12 and a second shell 13. The first shell 12 and the second shell 13 are both mounted in the accommodating cavity. In a direction from the first side portion 111 to the second side portion 113, the first shell 12 and the second shell 13 are adjacent to each other side by side. For example, in a perspective of FIG. 4 or FIG. 5, the first shell 12 and the second shell 13 are adjacent to each other side by side from left to right rather than being stacked from up to down. Shapes of the first shell 12 and the second shell 13 may be matched with the shape of the accommodating cavity. An end, far away from the second shell 13, of the first shell 12 approaches the first side portion 111, and an end, far away from the first shell 12, of the second shell 13 approaches the second side portion 113. The first shell 12 and the second shell 13 are fixedly connected. The structures of the first shell 12 and the second shell 13 may be the same or different. Certainly, optionally, the bearing structural member may alternatively include other shells. The other shells, the first shell 12, and the second shell 13 are adjacent to each other side by side.

The second cover 14 is arranged in the opening 11g between the first side portion 111 and the second side portion 113, so as to cover the bearing structural member within the accommodating cavity. Two opposite ends of the second cover 14 may be respectively matched with the first side portion 111 and the second side portion 113. The second cover 14 may be alternatively matched with the bearing structural member.

In this embodiment of this application, the bearing structural member is of a split design, and the first shell 12 and the second shell 13 can be separately mounted in the accommodating cavity that is in a closed-up state. This makes assembling of the bearing structural member and the first cover 24 easy without interference.

As shown in FIG. 2 and FIG. 4, the third cover 22 is mounted at one end of the first cover 24, and is located on the same side of the first side portion 111, the middle portion 112, and the second side portion 113; that is, the third cover 22 covers an opening at one end of the accommodating cavity (for example, an opening at the upper end of the accommodating cavity in a perspective of FIG. 2). The third cover 22 may be matched with the first cover 24 and the second cover 14. The third cover 22 may alternatively be matched with a bearing structural member. The third cover 22 may be of a plate structure with uniform or substantially uniform thickness, for example, a flat plate structure or a curved plate structure. Alternatively, the third cover 22 may be of a plate structure with non-uniform thickness.

As shown in FIG. 2 and FIG. 4, the fourth cover 23 is mounted at the other end of the first cover 24, and is located on the same side of the first side portion 111, the middle portion 112, and the third portion 113; and the fourth cover 23 and the third cover 22 are arranged opposite to each other at an interval. That is, the fourth cover 23 covers an opening at the other end of the accommodating cavity (for example, an opening at the lower end of the accommodating cavity in a perspective of FIG. 2). The four cover 23 may be matched with the first cover 24 and the second cover 14. The fourth cover 23 may alternatively be matched with the bearing structural member. The fourth cover 23 may be of a plate structure with uniform or substantially uniform thickness, for example, a flat plate structure or a curved plate structure. Alternatively, the fourth cover 23 may be of a plate structure with non-uniform thickness.

In this embodiment of this application, the first cover 24 may serve as an exterior part of the electronic device 10, and an outer surface (a surface opposite to an inner wall of the accommodating cavity) of the first cover 24 may serve as an exterior surface of the electronic device 10. The first cover 24 may have a display function. For example, the first cover 24 may be a curved screen module (may be referred to as a main screen) of the electronic device 10, and the entire area of the first cover 24 can be used for displaying. When the first cover 24 is a curved screen module, the first cover 24 may also include a curved screen. Alternatively, only a partial area of the first cover 24 can be used for displaying. Alternatively, the first cover 24 may be a cover plate of the electronic device 10, and the cover plate does not have a display function.

The bearing structural member may be, for example, a middle frame of the electronic device 10.

The second cover 14 may have a display function. For example, the cover 14 may be a display screen may be referred to as a secondary screen that may be a flat display screen or a curved screen) of the electronic device 10, and the entire area of the cover 14 can be used for displaying. Alternatively, only a partial area of the cover 14 can be used for displaying. Alternatively, the cover 14 may be a cover plate of the electronic device 10, and the cover plate does not have a display function.

The third cover 22 may have a display function. For example, the third cover 22 may be a display screen (may be referred to as a secondary screen, which may be a flat display screen or a curved screen) of the electronic device 10, and the entire area of the third cover 22 can be used for displaying. Alternatively, only a partial area of the third cover 22 can be used for displaying. Alternatively, the third cover 22 may be a cover plate of the electronic device 10, and the cover plate does not have a display function.

The fourth cover 23 may have a display function. For example, the fourth cover 23 may be a display screen (may be referred to as a secondary screen, which may be a flat display screen or a curved screen) of the electronic device 10, and the entire area of the fourth cover 23 can be used for displaying. Alternatively, only a partial area of the fourth cover 23 can be used for displaying. Alternatively, the fourth cover 23 may be a cover plate of the electronic device 10, and the cover plate does not have a display function.

The description will be continued below based on an example in which the first cover 24 is a curved screen module, the bearing structural member is a middle frame, and the second cover 14, the third cover 22 and the fourth cover 23 are all secondary screens. It should be understood that this is only an example, and in fact, the implementation of this application is not limited thereto.

Figure 6:
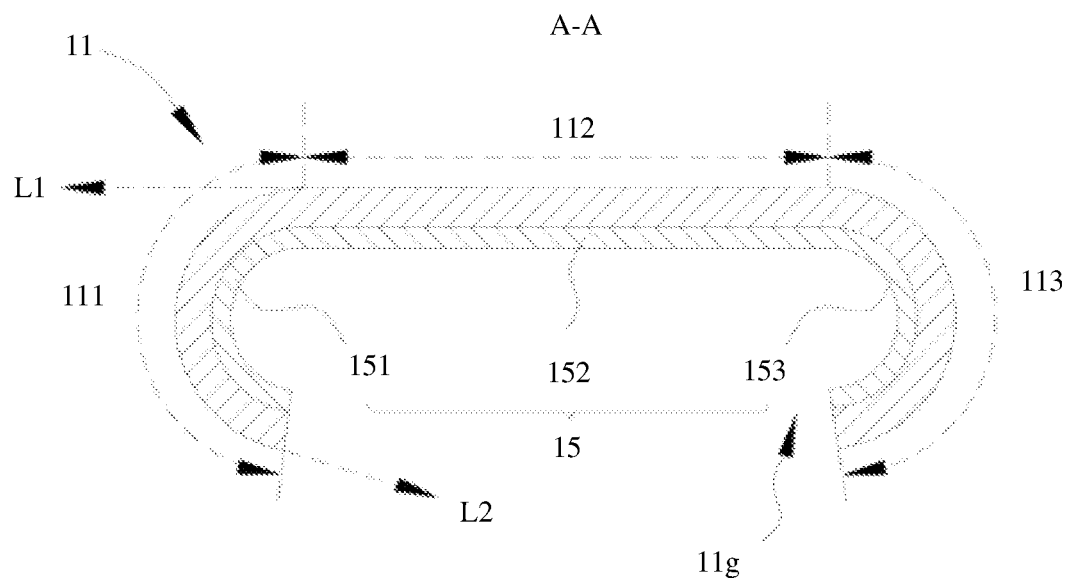
FIG. 6 is a cross-sectional view of a curved screen module of an electronic device in Embodiment 1.

In Embodiment 1, as shown in FIG. 6, the curved screen module may include a curved cover plate 11 and a curved screen 15, and the curved cover plate 11 fits the curved screen 15.

The curved cover plate 11 includes a first side portion 111, a middle portion 112, and a second side portion 113. The middle portion 112 may be of a flat plate structure. The first side portion 111 and the second side portion 113 are of the same structure, and both are symmetrically arranged on two opposite sides of the middle portion 112. Both the first side portion 111 and the second side portion 113 may be of an arc plate structure, and both are arched in directions facing away from each other. A bending angle of the first side portion 111 and a bending angle of the second side portion 113 both may reach 150 degrees to 180 degrees (including 150 degrees and 180 degrees). Using the first side portion 111 as an example, the bending angle may be measured as follows: Make a tangent line L1 of the first side portion 111 at a position, connected to the middle portion 112, of the first side portion 111, and make a tangent line L2 of the first side portion 111 at a position, far away from the middle portion 112, of the first side portion 111, where both the tangent line L1 and the tangent line L2 are radial. A direction of rotation from the tangent line L1 to the tangent line L2 is consistent with an extension direction of the first side portion 111. For example, in FIG. 6, a direction of rotation from the tangent line L1 to the tangent line L2 is counterclockwise, and a direction extending from an end, connected to the middle portion 112, of the first side portion 111 to an end, far away from the middle portion 112, of the first side portion is also counterclockwise. An angle formed between the tangent line L1 and the tangent line L2 is referred to as a bending angle.

Therefore, the first side portion 111 and the second side portion 113 may form bending of a large angle, so that the accommodating cavity is closed up at the opening 11g. In other embodiments, a bending angle of the first side portion 111 and/or the second side portion 113 may be another value, for example, may be less than or equal to 90 degrees. Alternatively, the first side portion 111 and the second side portion 113 may be in another shape, which is not limited to the shape of arc.

The curved screen 15 may be a flexible display panel, for example, a flexible organic light emitting diode panel; or the curved screen 15 may be a rigid display panel in a curved shape. A shape of the curved screen 15 is similar to that of the curved cover plate 11. The curved screen 15 is accommodated in the accommodating cavity formed by the first side portion 111, the middle portion 112, and the second side portion 113 in an enclosing manner, and fits the inner wall of the accommodating cavity. The curved screen 15 may include a first bending portion 151, a flat portion 152, and a second bending portion 153. The flat portion 152 is connected between the first bending portion 151 and the second bending portion 153. The flat portion 152 correspondingly fits the middle portion 112 of the curved cover plate 11. The first bending portion 151 correspondingly fits the first side portion 111. The second bending portion 153 correspondingly fits the second side portion 113. An end portion, close to the opening 11g, of the first bending portion 151 may be flush with an end portion, close to the opening 11g, of the first side portion 111. An end portion, close to the opening 11g, of the second bending portion 153 may be flush with an end portion, close to the opening 11g, of the second side portion 113. Therefore, both the front and the sides of the electronic device 10 can be used for displaying, so that display area is increased greatly and curved surrounding displaying can be achieved.

Figure 7:
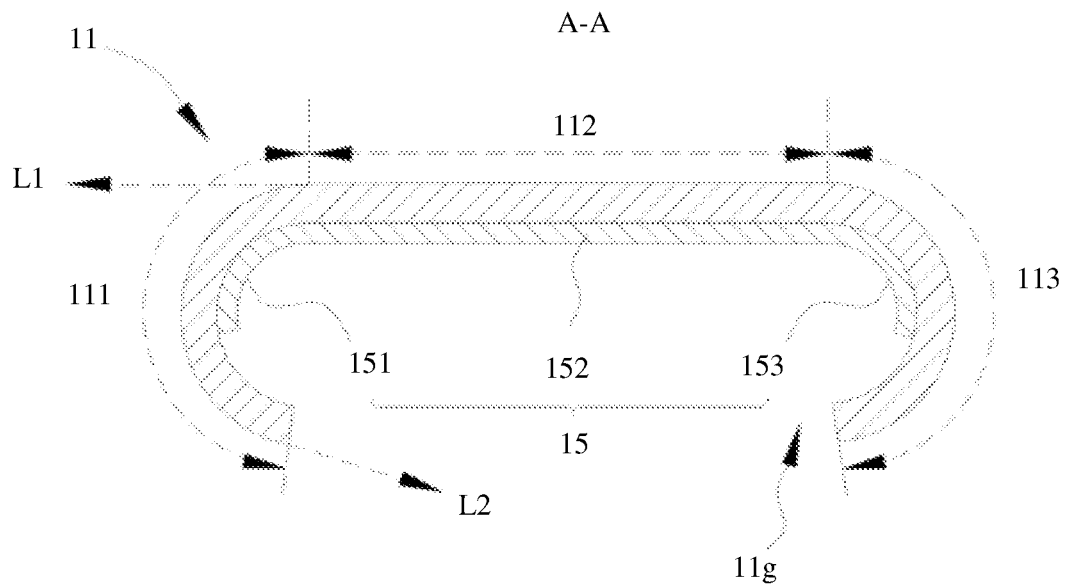
FIG. 7 is a cross-sectional view of a curved screen module of an electronic device according to another embodiment.

In other embodiments, an end portion, close to the opening 11g, of the first bending portion 151 may be flush with an end portion, close to the opening 11g, of the first side portion 111, but an end portion, close to the opening 11g, of the second bending portion 153 may be retracted into the accommodating cavity, that is, the end portion, close to the opening 11g, of the second side portion 113 may exceed the end portion, close to the opening 11g, of the second bending portion 153, and vice versa. Alternatively, as shown in FIG. 7, the first bending portion 151 may be shorter than the first side portion 111, that is, an end, close to the opening 11g, of the first side portion 111 may exceed an end, close to the opening 11g, of the first bending portion 151. The second bending portion 153 may be shorter than the second side portion 113, that is, an end, close to the opening 11g, of the second side portion 113 may exceed an end, close to the opening 11g, of the second bending portion 153. In addition, the curved cover plate 11 and the curved screen 15 may be integrated, that is, the curved screen module is an integrated display module.

According to Embodiment 1 of this application, the electronic device 10 uses the curved screen 15, so that the display area can be increased, and stereo display at a large visual angle can be achieved by the electronic device 10. By adding a secondary screen, 360-degree surrounding omnidirectional displaying can be further achieved. In addition, the first side portion 111 and the second side portion 113 of the curved cover plate 11 have large bending angles, so that the plump and smooth appearance can be created, while user's sense of grip is optimized.

The description below will be continued by using a flush fit of the curved screen 15 and the curved cover plate 11 shown in FIG. 6 as an example.

Figure 8:
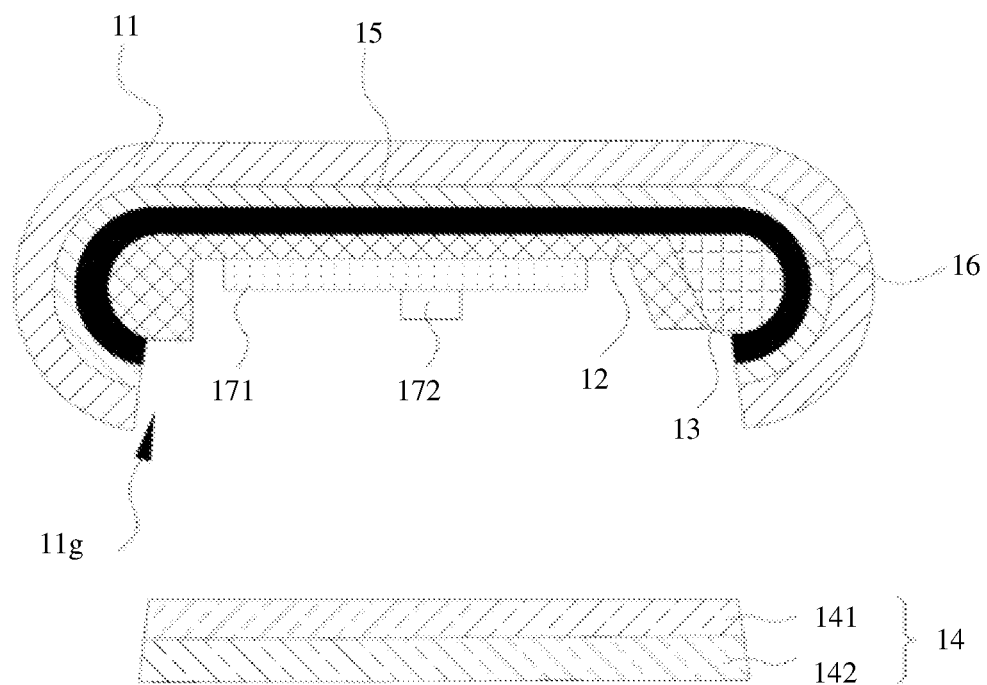
FIG. 8 is a cross-sectional view showing assembling of a curved screen module, a first shell, a second shell, and electronic components of an electronic device according to Embodiment 1.

In a perspective of FIG. 8, a first shell 12 is on the left, and a second shell 13 is on the right, which is merely an example. In fact, alternatively, a first shell 12 may be on the right, and a second shell 13 may be on the left.

As shown in FIG. 8, both the first shell 12 and the second shell 13 are accommodated in the accommodating cavity, and are bonded with at least part of a surface, facing away from the curved cover plate 11, of the curved screen 15 by using an adhesive 16. A shape of an end, far away from the second shell 13, of the first shell 12 is similar to that of the first bending portion 151, and this end of the first shell 12 is bonded with the first bending portion 151. A shape of an end, far away from the first shell 12, of the second shell 13 is similar to that of the second bending portion 153, and this end of the second shell 13 is bonded with the second bending portion 153. In other implementations, the first shell 12 and the second shell 13 may be fastened to the curved screen 15 in another manner, which is not limited to using an adhesive.

In the perspective of FIG. 8, the left-right direction is a width direction. The width direction is also a direction, within a cross section A-A, from the first side portion 111 to the second side portion 113, or from the second side portion 113 to the first side portion 111. A width may be defined based on this width direction. A width of the first shell 12 may be greater than a width of the second shell 13. A specific width ratio of the two may be determined as required. In addition, in the width direction, a distance from the left end of the first shell 12 to the right end of the second shell 13 is greater than a width of the opening 11g.

The first shell 12 and the second shell 13 can support the curved screen module. Electronic components may be arranged on a side, facing away from the curved screen 15, of the first shell 12 and/or the second shell 13. The electronic components include a circuit board 171 and a functional device 172 arranged on the circuit board 171, and the functional device 172 includes, but is not limited to a camera, a flash light, a battery, a fingerprint module, a loudspeaker, and the like. Certainly, a side, approaching the curved screen 15, of the first shell 12 and/or the second shell 13 may also be provided with a functional device. The functional device may be referred to as an in-screen functional device.

Figure 9:
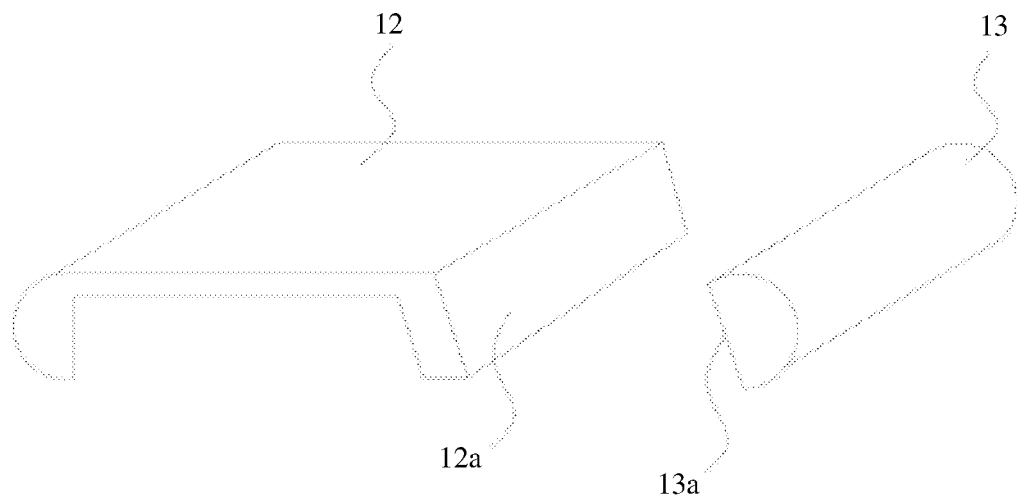
FIG. 9 is an exploded schematic diagram of the first shell and the second shell shown in FIG. 8.

As shown in FIG. 9, an end, close to the second shell 13, of the first shell 12, has a first fitting surface 12a. The first fitting surface 12a is a smooth inclined plane. The normal line of the first fitting surface 12a is inclined relative to the flat portion 152. An end, close to the first shell 12, of the second shell 13, has a second fitting surface 13a. The second fitting surface 13a is also a smooth inclined plane. Slope of the second fitting surface 13a matches slope of the first fitting surface 12a (for example, the second fitting surface 13a is parallel to the first fitting surface 12a). Being "smooth" means that the first fitting surface 12a and the second fitting surface 13a each have a small surface roughness, are smooth relatively, and can meet requirements for matching. The second fitting surface 13a fits the first fitting surface 12a (gap-less fit or approximately gap-less fit). Because of matching between the first fitting surface 12a and the second fitting surface 13a, the first shell 12 and the second shell 13 form a detachable fixed connection. This can improve structural strength of the middle frame, and is conductive to reliable support for the curved screen module.

In Embodiment 1, the electronic components may be mounted in the middle frame first, and then the middle frame is assembled with the curved screen module. Alternatively, the middle frame is assembled with the curved screen module first, and then the electronic components are mounted in the middle frame.

As shown in FIG. 8 and FIG. 9, in a process of assembling the curved screen module with the middle frame, a surface, facing away from the curved cover plate 11, of the curved screen 15 may be attached with back glue in advance, the second shell 13 with a smaller width is first placed in a position, corresponding to the second bending portion 153, of the accommodating cavity, from the opening 11g, and then the second shell 13 is bonded with the back glue on the curved screen 15, so that the second bending portion 153 is connected to the second shell 13. Then the first shell 12 is kept in an inclined state, a first end (the first end is an end, far away from the second shell 13, of the first shell 12 after the first shell 12 is mounted in place) of the first shell 12 is placed in a position, corresponding to the first bending portion 151, of the accommodating cavity from the opening 11g. In this case, a second end (opposite to the first end) of the first shell 12 may be located outside the accommodating cavity. After the first end is mounted in place, the second end is placed in the second accommodating cavity, and finally the first shell 12 is connected to the curved screen 15 by using the back glue, and the first fitting surface 12a is matched with the second fitting surface 13a. To ensure that the first shell 12 successfully enters the accommodating cavity from the opening 11g, the width of the first shell 12 and the width of the opening 11g may be reasonably designed, so that, when entering the accommodating cavity, the second end of the first shell 12 does not interfere with an end, close to the opening 11g, of the second side portion 113.

Certainly, the back glue may be attached only on surfaces of the first shell 12 and the second shell 13, or may be attached on surfaces of the curved screen 15, the first shell 12, and the second shell 13. Alternatively, a bonding layer may be formed between the curved screen 15 and the first shell 12 and the second shell 13 in another manner, for example, through a glue dispensing process.

As shown in FIG. 8, a secondary screen 14 may include a secondary screen cover plate 142 and a secondary display panel 141 that fit each other. After the middle frame is mounted in the accommodating cavity (the electronic device has been mounted in the middle frame), the secondary screen 14 covers the opening 11g, the secondary display panel 141 faces the inside of the accommodating cavity, and the secondary screen cover plate 142 is used as an exterior part of the electronic device 10. The secondary screen 14 may be tightly jointed with the curved screen module, so that the electronic device 10 achieves 360-degree surrounding omnidirectional displaying and the integrated seamless appearance is formed. In other implementations, the secondary screen cover plate 142 and the secondary display panel 141 may be integrated, that is, the secondary screen 14 is an integrated display module.

In Embodiment 1, the middle frame is designed into a split structure including the first shell 12 and the second shell 13, so that the first shell 12 and the second shell 13 can be separately mounted in the accommodating cavity of the curved screen module. This split-type design of the middle frame can meet assembly requirements when the opening 11g between the first side portion 111 and the second side portion 113 in the curved screen module is relatively narrow while the overall width of the middle frame is relatively large, and overcomes a difficulty in assembly of a conventional middle frame and a large-radian curved screen module, thereby facilitating implementation of the design of large-visual-angle displaying of the electronic device 10.

Figure 10:
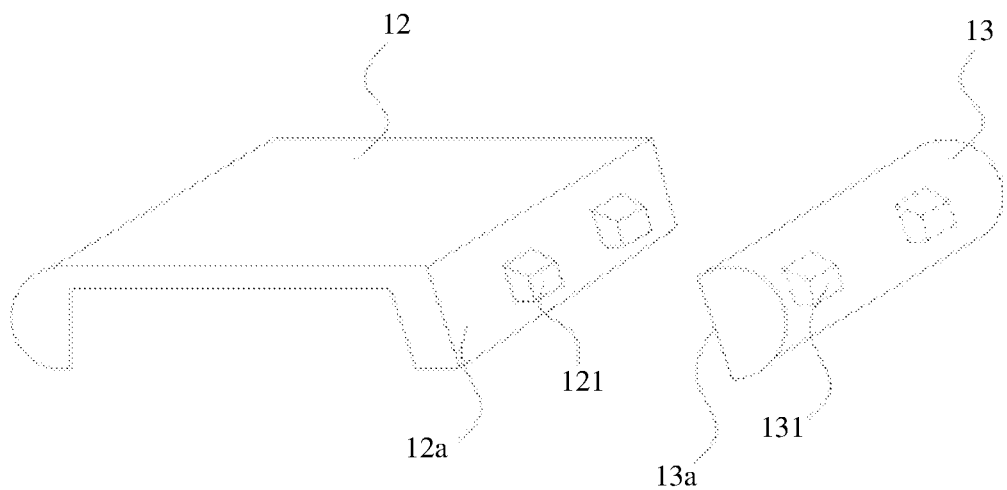
FIG. 10 is an exploded schematic diagram of a first shell and a second shell according to Embodiment 2.
Figure 11:
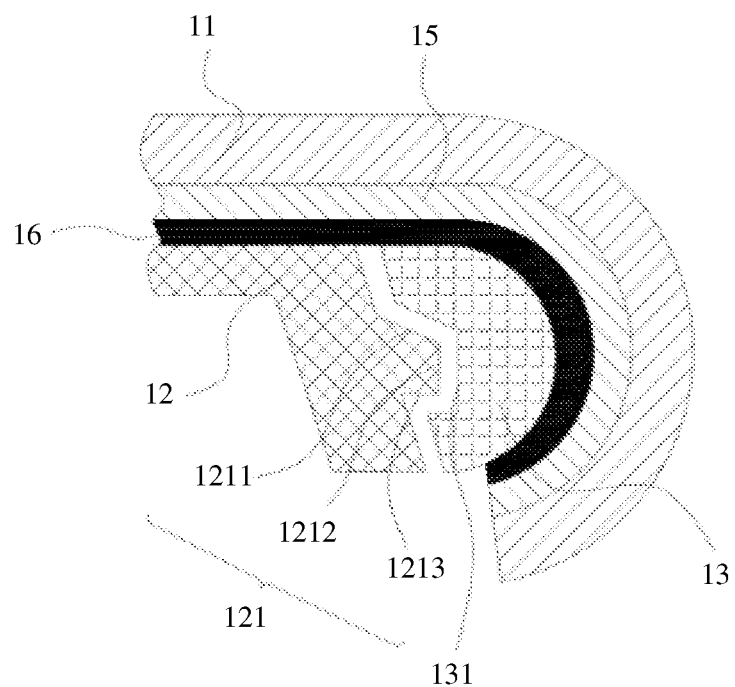
FIG. 11 is a cross-sectional view showing assembling of a curved screen module and the first shell and the second shell according to Embodiment 2.

As shown in FIG. 10 and FIG. 11, in Embodiment 2, a difference from the foregoing Embodiment 1 is as follows: The first fitting surface 12a is protrusively provided with a first engaging protrusion 121, the second fitting surface 13a is provided with a first engaging slot 131, and the first engaging protrusion 121 is matched with the first engaging slot 131, so as to form a detachable connection. The first engaging protrusion 121 and the second engaging slot 131 are matched in shape.

The first engaging protrusion 121 may be, for example, of a block structure provided with edges. The first engaging protrusion 121 may have a first engaging surface 1211, a first connecting surface 1212, and a second engaging surface 1213. The first connecting surface 1212 is connected between the first engaging surface 1211 and the second engaging surface 1213. The first engaging surface 1211 and the first connecting surface 1212 may form an obtuse angle. The first connecting surface 1212 and the second engaging surface 1213 may form a right angle or approximately a right angle. The first engaging surface 1211 is closer to the curved screen 15 than the second engaging surface 1213. In the process of placing the second end of the first shell 12 in the accommodating cavity for matching with the second shell 13, the first engaging surface 1211 may have a function of guiding to facilitate inserting the first engaging protrusion 121 in the first engaging slot 131. When the second end of the first shell 12 is arranged in place, the first engaging protrusion 121 is inserted into and engaged with the first engaging slot 131. In this case, the first engaging surface 1211 and the second engaging surface 1213 are respectively matched with corresponding surfaces of the first engaging slot 131.

As shown in FIG. 10, there may be several (for example, two) first engaging protrusions 121. Several first engaging protrusions 121 may be arranged at intervals. The quantity of the first engaging slots 131 may match the quantity of the first engaging protrusions 121. For example, the quantity of the first engaging slots 131 is equal to the quantity of the first engaging protrusions 121, and one first engaging slot 131 is matched with one first engaging protrusion 121 correspondingly. Alternatively, the quantity of the first engaging slots 131 is less than the quantity of the first engaging protrusions 121, and a plurality of first engaging protrusions 121 may be matched with the same first engaging slot 131.

In Embodiment 2, through engagement between the first engaging protrusions 121 and the first engaging slots 131, the first shell 12 and the second shell 13 form a detachable connection, and the first shell 12 and the second shell 13 can be conveniently and reliably fixedly mounted in the accommodating cavity of the curved screen module.

Figure 12:
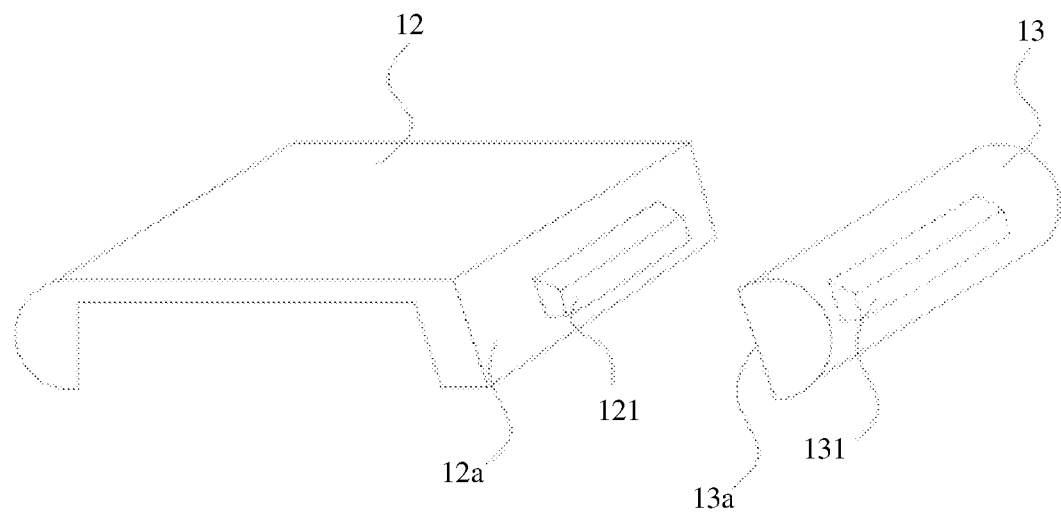
FIG. 12 is an exploded schematic diagram of a first shell and a second shell according to another embodiment.

In other embodiments, positions of the first engaging protrusions 121 and the first engaging slots 131 can be interchanged; that is, the first engaging protrusions 121 are arranged on the second fitting surface 13a of the second shell 13, and the first engaging slots 131 are formed on the first fitting surface 12a of the first shell 12. The structures of the first engaging protrusions 121 and the first engaging slots 131 are not limited to the above, but can be designed as required, provided that the detachable connection can be achieved. For example, the first protrusions 121 each may be approximately in the shape of a hemisphere or a semi-ellipsoid. The quantity of the first engaging protrusion 121 and the quantity of the first engaging slots 131 may be set as required, for example, may be at least one. As shown in FIG. 12, when there is only one first engaging protrusion 121, to ensure connection strength, the first engaging protrusion 121 may be arranged in the shape of a strip, and two opposite ends of the first engaging protrusion 121 are required to be as close as possible to two opposite sides of the first fitting surface 12a. Correspondingly, the first engaging slot 131 may be an elongated slot. Alternatively, the first fitting surface 12a and the second fitting surface 13a are not required to be inclined planes. For example, at least one of the two may be a plane perpendicular to the flat portion 152 of the curved screen 15, or a curved surface.

Figure 13:
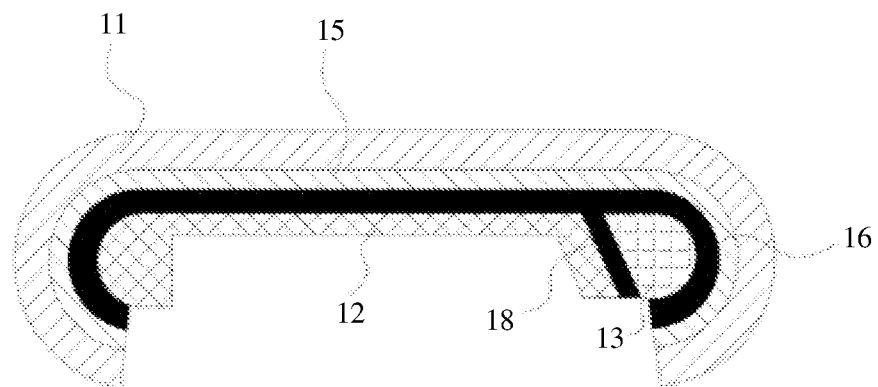
FIG. 13 is a cross-sectional view showing assembling of a curved screen module and a first shell and a second shell according to Embodiment 3.

As shown in FIG. 13 and FIG. 9, in Embodiment 3, a difference from Embodiment 1 is as follows: The first fitting surface 12a and the second fitting surface 13a are not in direct contact and matching, but form a non-detachable connection by using an adhesive 18. This assembly design makes a connection between the first shell 12 and the second shell 13 reliable. Bonding may be achieved through glue dispensing in a gap between the first fitting surface 12a and the second fitting surface 13a. Alternatively, bonding may be achieved by attaching back glue on the first fitting surface 12a and/or the second fitting surface 13a. In other implementations, the first fitting surface 12a and the second fitting surface 13a are not required to be inclined planes. For example, at least one of the two may be a curved surface, or a plane perpendicular to the flat portion 152 of the curved screen 15.

Figure 14:
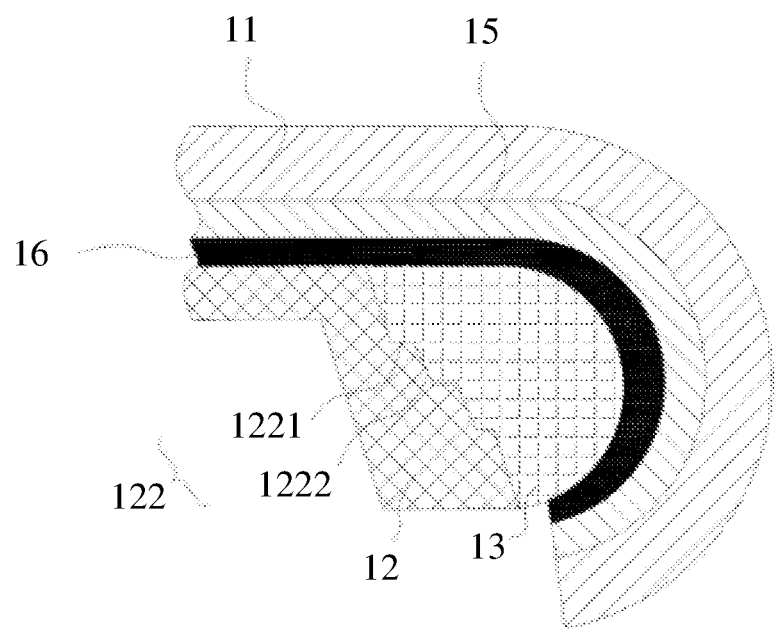
FIG. 14 is a cross-sectional view showing assembling of a curved screen module and a first shell and a second shell according to Embodiment 4.

As shown in FIG. 14 and FIG. 9, in Embodiment 4, a difference from Embodiment 1 is as follows: The first fitting surface 12a and the second fitting surface 13a are stepped surfaces instead of inclined planes. Several first steps 122 (for example, two first steps) are formed on the first fitting surface 12a, several second steps (for example, two second steps) are formed on the second fitting surface 13a; and the first steps 122 and the second steps both include two stepped surfaces connected at an included angle, for example, the first steps 122 each include a stepped surface 1221 and a stepped surface 1222, and the stepped surface 1221 and the stepped surface 1222 form an included angle, where the included angle may be an obtuse angle. One first step 122 is engaged with one second step correspondingly, so that the first shell 12 and the second shell 13 form a detachable connection. Therefore, the first shell 12 and the second shell 13 can be conveniently and reliably fixedly mounted in the accommodating cavity of the curved screen module. In addition, two stepped surfaces of the first step 122 and the second step form an obtuse angle. This can prevent the first shell 12 and the second shell 13 from forming a sharp and weak corner, facilitates machining of the first shell 12 and the second shell 13, and can also improve structural strength of the first shell 12 and the second shell 13.

Figure 15:
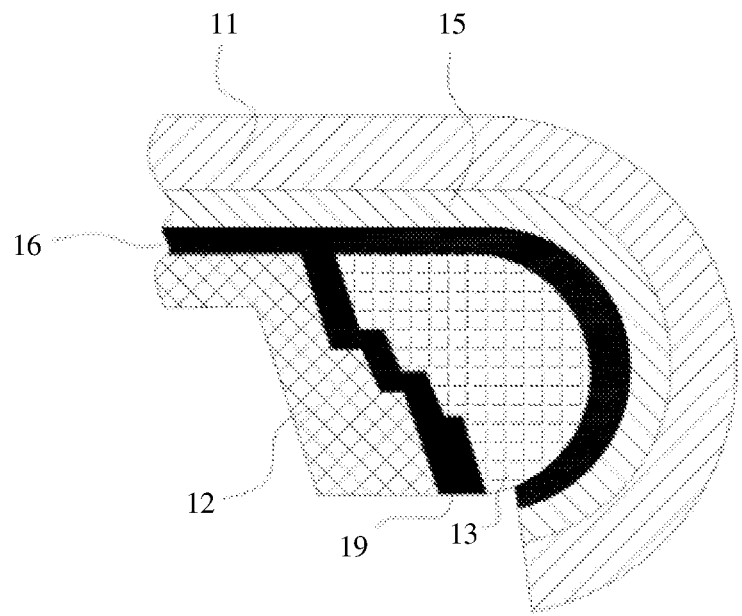
FIG. 15 is a cross-sectional view showing assembling of a curved screen module and a first shell and a second shell in Embodiment 5.

As shown in FIG. 15 and FIG. 9, in Embodiment 5, a difference from the foregoing Embodiment 4 is as follows: The first step 122 and the second step are not directly engaged with each other, a gap is formed between the first fitting surface 12a and the second fitting surface 13a and is filled with an adhesive 19, and the first fitting surface 12a and the second fitting surface 13a are bonded together by using the adhesive 19, so as to form a non-detachable connection. Bonding may be achieved through a glue dispensing process. This method can enhance connection strength of the first fitting surface 12a and the second fitting surface 13a.

In Embodiment 6, a difference from all the foregoing embodiments is as follows: The first fitting surface 12a and the second fitting surface 13a are not straight surfaces, but include several sub-surfaces connected at included angles. A subs-surface of the first fitting surface 12a is provided with a second engaging protrusion 123. A sub-surface of the second fitting surface 13a is provided with a second engaging slot 132. The second engaging protrusion 123 is matched with the second engaging slot 132.

Figure 16:
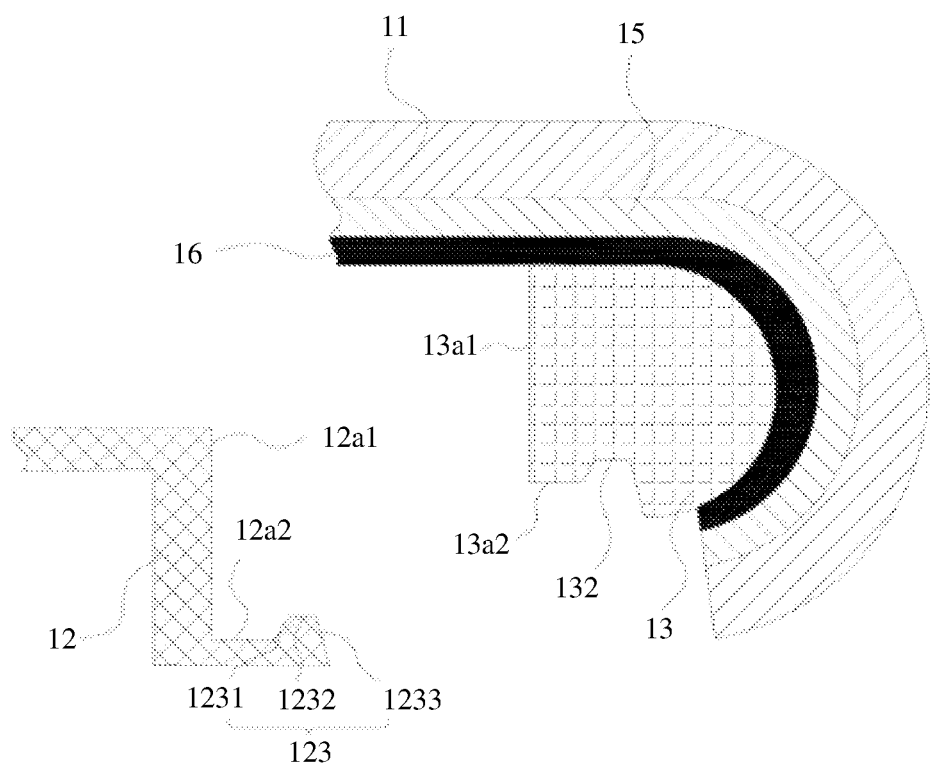
FIG. 16 is an exploded schematic diagram of a curved screen module and a first shell and a second shell according to Embodiment 6.
Figure 17:
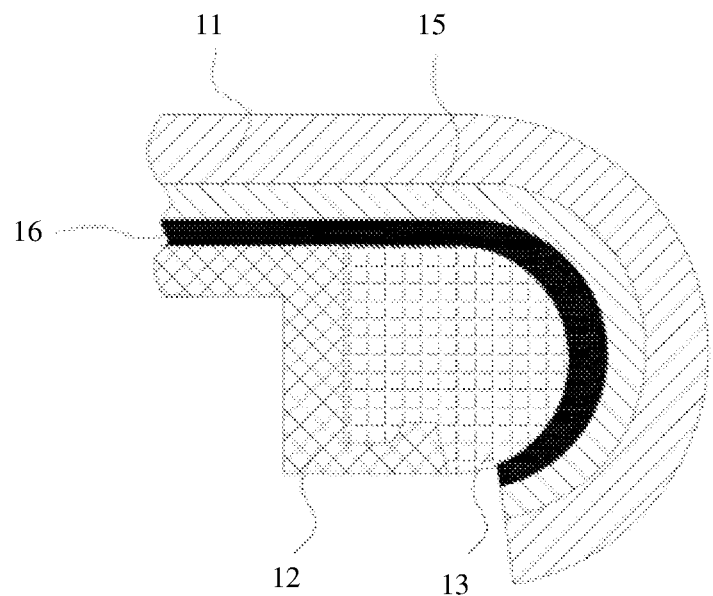
FIG. 17 is a cross-sectional view showing assembling of the curved screen module and the first shell and the second shell shown in FIG. 15.

Specifically, as shown in FIG. 16 and FIG. 17, the first fitting surface includes a first subs-surface 12a1 and a second sub-surface 12a2. The first sub-surface 12a1 and the second sub-surface 12a2 are connected at an included angle. The included angle, for example, is approximately a right angle, and may alternatively be an obtuse angle or an acute angle. The normal line of the first sub-surface 12a1 may be substantially parallel to the flat portion 152 of the curved screen 15, and a side, far away from the second sub-surface 12a2, of the first sub-surface 12a1 may be connected to the curved screen 15 by using an adhesive 16. The second sub-surface 12a2 is protrusively provided with a second engaging protrusion 123. The second engaging protrusion 123 may have a third engaging surface 1231, a second connecting surface 1232, and a fourth engaging surface 1233. The second connecting surface 1232 is connected between the third engaging surface 1231 and the fourth engaging surface 1233. The second connecting surface 1232 may be substantially parallel to the flat portion 152 of the curved screen 15. The third engaging surface 1231 and the second connecting surface 1232 may form an obtuse angle. The second connecting surface 1232 and the fourth engaging surface 1233 may form an obtuse angle.

As shown in FIG. 16, the second fitting surface 13a includes a third sub-surface 13a1 and a fourth sub-surface 13a2. The third sub-surface 13a1 and the first sub-surface 12a1 are opposite to each other (for example, may be in gap-less fit, or a set gap may be maintained). The fourth sub-surface 13a2 is provided with a second engaging slot 132, and the shape of the second engaging slot 132 is matched with that of the second engaging protrusion 123.

As shown in FIG. 16 and FIG. 17, in a process of placing the first shell 12 in the accommodating cavity for matching with the second shell 13, the third engaging surface 1231 and the fourth engaging surface 1233 may have a function of guiding, so that the second engaging protrusion 123 can be easily inserted into the second engaging slot 132. When the first shell 12 is arranged in place, the second engaging protrusion 123 is inserted in and engaged with the second engaging slot 132. In this case, the third engaging surface 1231 and the fourth engaging surface 1233 are respectively matched with corresponding surfaces of the second engaging slot 132, so as to form a detachable connection.

In Embodiment 6, there may be several (for example, one or at least two) second engaging protrusions 123, for example, may be one, or at least two. The quantity of the second engaging slots 132 may match the quantity of the second engaging protrusions 123. When there is only one second engaging protrusion 123, to ensure connection strength, the second engaging protrusion 123 may be arranged in the shape of a strip, and two opposite ends of the second engaging protrusion 123 are required to be as close as possible to two opposite sides of first fitting surface 12a (using a perspective of FIG. 16 as an example, two opposite ends of the second engaging protrusion 123 refer to two opposite ends perpendicular to the direction of principal plane). Correspondingly, the first engaging slot 131 may be an elongated slot. When there are at least two second engaging protrusions 123, several second engaging protrusions 123 may be arranged at intervals. Correspondingly, the quantity of the second engaging slots 132 is equal to the quantity of the second engaging protrusions 123. One second engaging slot 132 is matched with one second first engaging protrusion 123 correspondingly; or the quantity of the second engaging slots 132 is less than the quantity of the second engaging protrusions 123, and a plurality of second engaging protrusions 123 may be matched with the same second engaging slot.

In Embodiment 6, through matching between the first sub-surface 12a1 and the third sub-surface 13a1 and engagement between the second engaging protrusions 123 and the second engaging slots 132, the first shell 12 and the second shell 13 form a detachable connection, and the first shell 12 and the second shell 13 can be conveniently and reliably fixedly mounted in the accommodating cavity of the curved screen module.

In other embodiments, positions of the second engaging protrusions 123 and the second engaging slots 132 can be interchanged, that is, the second engaging protrusions 123 are arranged on the second fitting surface 13a of the second shell 13, and the second engaging slots 132 are formed on the first fitting surface 12a of the first shell 12. The structures of the second engaging protrusions 123 are not limited to the above, but can be designed as required, provided that the detachable connection can be achieved. For example, the second protrusions 123 each may be approximately in the shape of a hemisphere or a semi-ellipsoid.

Figure 18:
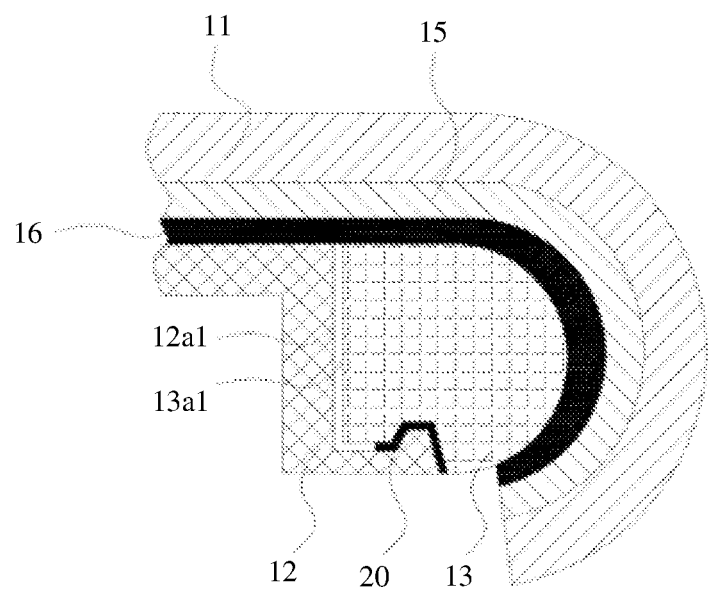
FIG. 18 is a cross-sectional view showing assembling of a curved screen module and a first shell and a second shell according to Embodiment 7.

As shown in FIG. 18 and FIG. 16, in Embodiment 7, a difference from the foregoing Embodiment 6 is as follows: The second engaging protrusion 123 and the second engaging slot 132 are not in direct contact for fitting, a gap is formed between the second engaging protrusion 123 and the second engaging slot 132 and is filled with an adhesive 20, and the first fitting surface and the second fitting surface are bonded together by using adhesive 20, so as to form a non-detachable connection. Bonding may be achieved through dispensing glue in the gap. A gap may be formed between the first sub-surface 12a1 and the third sub-surface 13a1, and the gap between the first sub-surface 12a1 and the third sub-surface 13a1 may serve as a reserved space for containing glue. During glue dispensing, the amount of glue can be controlled, to ensure that glue is filled in an area where the second engaging protrusion 123 is matched with the second engaging slot 132, and ensure that the glue enters the reserved space at most without overflowing from the reserved space, so as to prevent the glue from reaching the adhesive 16 between the first shell 12 and the curved screen 15 and the adhesive 16 between the second shell 13 and the curved screen 15. According to Embodiment 7, connection strength of the first fitting surface and the second fitting surface can be enhanced.

Figure 19:
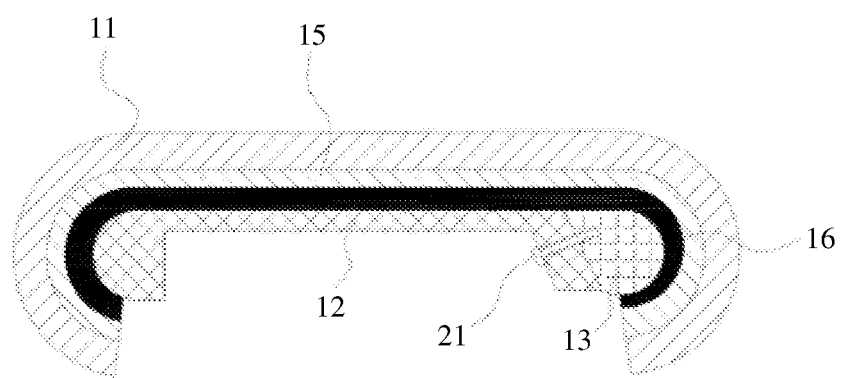
FIG. 19 is a cross-sectional view showing assembling of a curved screen module and a first shell and a second shell according to embodiment 8.

As shown in FIG. 19, in embodiment 8, a difference from all the foregoing embodiments is as follows: The first shell 12 and the second shell 13 may form a detachable connection by using a connector 21. For example, as shown in FIG. 19 and FIG. 9, the connector 21 may penetrate the first fitting surface 12a of the first shell 12 and the second fitting surface 13a of the second shell 13, to fasten the first shell 12 and the second shell 13. Certainly, the connector 21 may alternatively be mounted at any other suitable position on the first shell 12 and the second shell 13. The connector 21 includes, but is not limited to, a screw, a pin, and the like. This method can enhance connection strength of the first shell 12 and the second shell 13. In other embodiments, the first shell 12 and the third shell 13 may form a non-detachable connection by using a connector 21, where the connector 21 may be a rivet. Alternatively, the connector 21 may not be used, and another process for forming a non-detachable connection may be used to assemble the first shell 12 and the second shell 13, for example, welding (such as ultrasonic welding).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
a first cover, a first shell, and a second shell, wherein
the first cover comprises a first side portion, a middle portion, and a second side portion, the middle portion is connected between the first side portion and the second side portion, the first side portion and the second side portion are spaced apart from and opposite to each other to form an opening, and the first side portion, the middle portion, and the second side portion are enclosed to form an accommodating cavity;
the first shell and the second shell are both mounted in the accommodating cavity;
in a direction from the first side portion to the second side portion, the first shell and the second shell are adjacent to each other side by side; the first shell and the second shell are fixedly connected; and
the first shell and the second shell are matched to support the first cover.

2. The electronic device according to claim 1, wherein the accommodating cavity is closed up at the opening.

3. The electronic device according to claim 1, wherein the first side portion and the second side portion are both arched in directions facing away from each other.

4. The electronic device according to claim 3, wherein a bending angle of the first side portion ranges from 150 degrees to 180 degrees; and/or a bending angle of the second side portion ranges from 150 degrees to 180 degrees.

5. The electronic device according to claim 1, wherein an end, far away from the second shell, of the first shell is close to the first side portion, and an end, far away from the first shell, of the second shell is close to the second side portion.

6. The electronic device according to claim 1, wherein a distance between an end, far away from the second shell, of the first shell and an end, far away from the first shell, of the second shell is a first distance, and the first distance is greater than a width of the opening.

7. The electronic device according to claim 1, wherein the first cover comprises a curved screen, the curved screen is accommodated in the accommodating cavity, the curved screen comprises a first bending portion and a second bending portion, the first bending portion correspondingly fits the first side portion, the second bending portion correspondingly fits the second side portion.

8. The electronic device according to claim 7, wherein a shape of an end, far away from the second shell, of the first shell is similar to that of the first bending portion; and a shape of an end, far away from the first shell, of the second shell is similar to that of the second bending portion.

9. The electronic device according to the claim 7, wherein the first cover comprises a curved cover plate; the curved cover plate comprises the first side portion, the middle portion, and the second side portion; the curved screen is accommodated in the accommodating cavity and fits the curved cover plate; and both the first shell and the second shell are fixedly connected to a surface, facing away from the curved cover plate, of the curved screen.

10. The electronic device according to claim 1, wherein the first shell has a first fitting surface, the second shell has a second fitting surface, and the first fitting surface and the second fitting surface form a detachable connection or a non-detachable connection.

11. The electronic device according to claim 10, wherein the first fitting surface is protrusively provided with at least one first engaging protrusion, the second fitting surface is provided with at least one first engaging slot, and the at least one first engaging protrusion is matched with the at least one first engaging slot to form a detachable connection.

12. The electronic device according to claim 10, wherein the first fitting surface and the second fitting surface are both inclined planes, and the first fitting surface and the second fitting surface are connected by using an adhesive, so as to form a non-detachable connection.

13. The electronic device according to claim 10, wherein the first fitting surface and the second fitting surface are both stepped surfaces, and the first fitting surface and the second fitting surface are engaged with each other, so as to form a detachable connection or a non-detachable connection.

14. The electronic device according to claim 10, wherein the first fitting surface and the second fitting surface are connected by using an adhesive, so as to form a non-detachable connection.

15. The electronic device according to claim 10, wherein the first fitting surface comprises a first sub-surface and a second sub-surface, the first sub-surface and the second sub-surface are connected at an included angle, and the second sub-surface is protrusively provided with a second engaging protrusion; and the second fitting surface comprises a third sub-surface and a fourth sub-surface, the third sub-surface and the fourth sub-surface are connected at an included angle, the third sub-surface faces the first sub-surface, the fourth sub-surface is provided with a second engaging slot, and the second engaging protrusion is inserted into the second engaging slot, and forms a non-detachable connection with an inner wall of the second engaging slot by using an adhesive.

16. The electronic device according to claim 1, wherein the electronic device comprises a second cover, and the second cover is arranged at the opening, and covers the first shell and the second shell within the accommodating cavity.

17. The electronic device according to claim 16, wherein the second cover comprises a display screen.

18. The electronic device according to claim 1, wherein the electronic device comprises a third cover and a fourth cover, the third cover and the fourth cover are respectively mounted at two opposite ends of the first cover, the third cover is located on the same side as the first side portion, the middle portion, and the second side portion, and the fourth cover is located on the same side as the first side portion, the middle portion, and the second side portion.

19. The electronic device according to claim 18, wherein at least one of the third cover or the fourth cover comprises a display screen.

20. The electronic device according to claim 1, wherein the electronic device is a mobile phone, and the first shell and the second shell constitute a middle frame of the mobile phone.

* * * * *